United States Patent
Ho et al.

(10) Patent No.: US 7,963,215 B2
(45) Date of Patent: Jun. 21, 2011

(54) ELECTROMAGNETIC INDUCTION HEATING GRILL TOASTER

(75) Inventors: Ching-Ching Ho, Taipei (TW); Shih-Wei Tung, Taipei (TW); Yi-Hao Lin, Taipei (TW); Jr-Ren Ji, Taipei (TW)

(73) Assignee: Tsann Kuen (China) Enterprise Co., Ltd., Fujian (CN)

( * ) Notice: Subject to any disclaimer, the term of this patent is extended or adjusted under 35 U.S.C. 154(b) by 680 days.

(21) Appl. No.: 12/071,730

(22) Filed: Feb. 26, 2008

(65) Prior Publication Data

US 2008/0257170 A1      Oct. 23, 2008

(30) Foreign Application Priority Data

Apr. 20, 2007   (TW) .............................. 96206351 U

(51) Int. Cl.
  A47J 37/06     (2006.01)
  H05B 6/12      (2006.01)
  H05B 3/06      (2006.01)
(52) U.S. Cl. ................ 99/377; 99/378; 99/380; 99/372; 219/621; 219/622; 219/627
(58) Field of Classification Search ............ 99/389, 99/391, 372, 377, 380, 378; 219/620, 621, 219/622, 627
See application file for complete search history.

(56) References Cited

U.S. PATENT DOCUMENTS

| | | | | |
|---|---|---|---|---|
| 5,743,173 A * | 4/1998 | Hayashi et al. | ................. | 99/331 |
| 6,427,581 B1 * | 8/2002 | Wu | ................................. | 99/332 |
| 6,429,409 B1 * | 8/2002 | Siu | ............................. | 219/450.1 |
| 6,483,089 B1 * | 11/2002 | Wright et al. | ................. | 219/621 |
| 6,864,468 B2 * | 3/2005 | Kim et al. | ...................... | 219/601 |
| 2009/0320694 A1 * | 12/2009 | Parsons | ........................... | 99/373 |

* cited by examiner

*Primary Examiner* — Reginald L Alexander
(74) *Attorney, Agent, or Firm* — Rosenberg, Klein & Lee

(57) ABSTRACT

An electromagnetic induction heating grill toaster that includes a first casing body, a first baking tray, a second casing body, and a second baking tray. The first casing body has a first electromagnetic induction element, a first micro-crystal plate, and a control element. The first baking tray is detachably disposed on the first casing body. The second casing body has one side pivoted on one side of the first casing body and has a second electromagnetic induction element and a second micro-crystal plate. The second baking tray is detachably disposed on the second casing body. The present invention utilizes the advantage of quick heating of electromagnetic induction, in order to reduce the amount of time users need to wait for the grill toast to preheat. Hence, the present invention not only reduces power use, but also saves time for the user.

11 Claims, 7 Drawing Sheets

ELECTROMAGNETIC INDUCTION HEATING GRILL TOASTER

BACKGROUND OF THE INVENTION

1. Field of The Invention

The present invention relates to a grill toaster, and particularly relates to an electromagnetic induction heating grill toaster.

2. Description of the Related Art

In general, there are many different types of grill toasters available on the market, such as fixed types or portable types, etc. A grill toaster is used in daily life, for making food such as toast, sandwiches or other food that needs toasting or grilling. It is thus clear that the grill toaster is an essential piece of electrical equipment.

Referring to FIG. 1, a common grill toaster 10 is shown. The grill toaster 10 includes a top cover 20, a bottom cover 30, two baking trays 40, 50, and two electric heating pipes 60, 70. Food is placed on the two baking trays 40, 50 that are respectively fixed on the top cover 20 and the bottom cover 30. The two electric heating pipes 60, 70 are respectively installed in the top cover 20 and the bottom cover 30 in order to heat the two baking trays 40, 50 for grilling and toasting the food.

However, after using the grill toaster 10, it is inconvenient for user to clean the two baking trays 40, 50. Moreover, water may flow into the grill toaster 10 during cleaning of the grill toaster 10 so that some inner electronic components can become damaged by water. Moreover, the grill toaster 10 uses the two electric heating pipes 60, 70 as the heating elements. The two electric heating pipes 60, 70 are two-steps heat transmissions so the time required for preheating the grill toaster 10 is very long. Therefore, the grill toaster 10 of the prior art not only wastes power, but also requires users to wait for a long time.

Furthermore, the heating mode of the grill toaster 10 is restricted due to the usage of the two electric heating pipes 60, 70, so the cooking temperature cannot exceed 250☐. However, when the cooking temperature exceeds 250☐, the two baking trays 40, 50 can become deformed.

SUMMARY OF THE INVENTION

The first object of the present invention is to provide an electromagnetic induction heating grill toaster. The present invention utilizes the advantage of electromagnetic induction, in that it quickly heats the grill toaster up, in order to reduce the time required for preheating the grill toaster. Hence, the present invention not only reduces power use, but also reduces the time users need to waiting before they can start cooking.

The second object of the present invention is to provide an electromagnetic induction heating grill toaster. A baking tray is detachably disposed on a casing body so it is easy for user to assemble, detach, and clean the baking tray.

The third object of the present invention is to provide an electromagnetic induction heating grill toaster. When two baking trays are respectively detached from two casing bodies, the heating grill toaster is divided into two separate electromagnetic ovens.

One aspect of the present invention is an electromagnetic induction heating grill toaster that includes a first casing body, a first baking tray, a second casing body, and a second baking tray. The first casing body has a first electromagnetic induction element, a first micro-crystal plate, and a control element. The control element is disposed on an inner bottom portion of the first casing body. The first micro-crystal plate is disposed on a top portion of the first casing body. The first electromagnetic induction element is electrically connected with the control element. The first baking tray is detachably disposed on the first casing body. The second casing body has one side pivoted on one side of the first casing body and has a second electromagnetic induction element and a second micro-crystal plate. The second micro-crystal plate is disposed on a top portion of the second casing body. The second electromagnetic induction element is disposed under the second micro-crystal plate. The second baking tray is detachably disposed on the second casing body.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED BEST MOLDS

Figure 1:
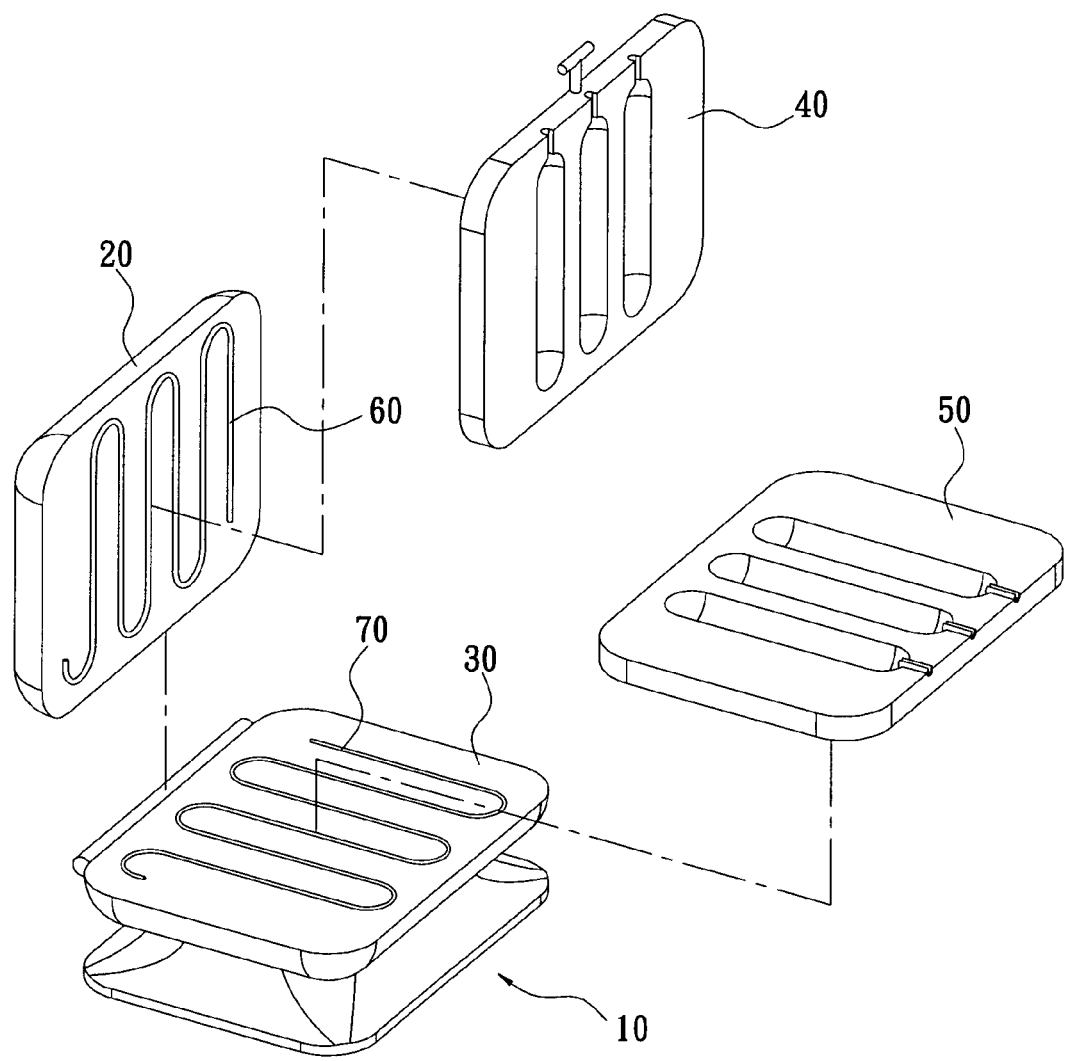
FIG. 1 is a perspective, exploded view of a grill toaster of the prior art.
Figure 2:
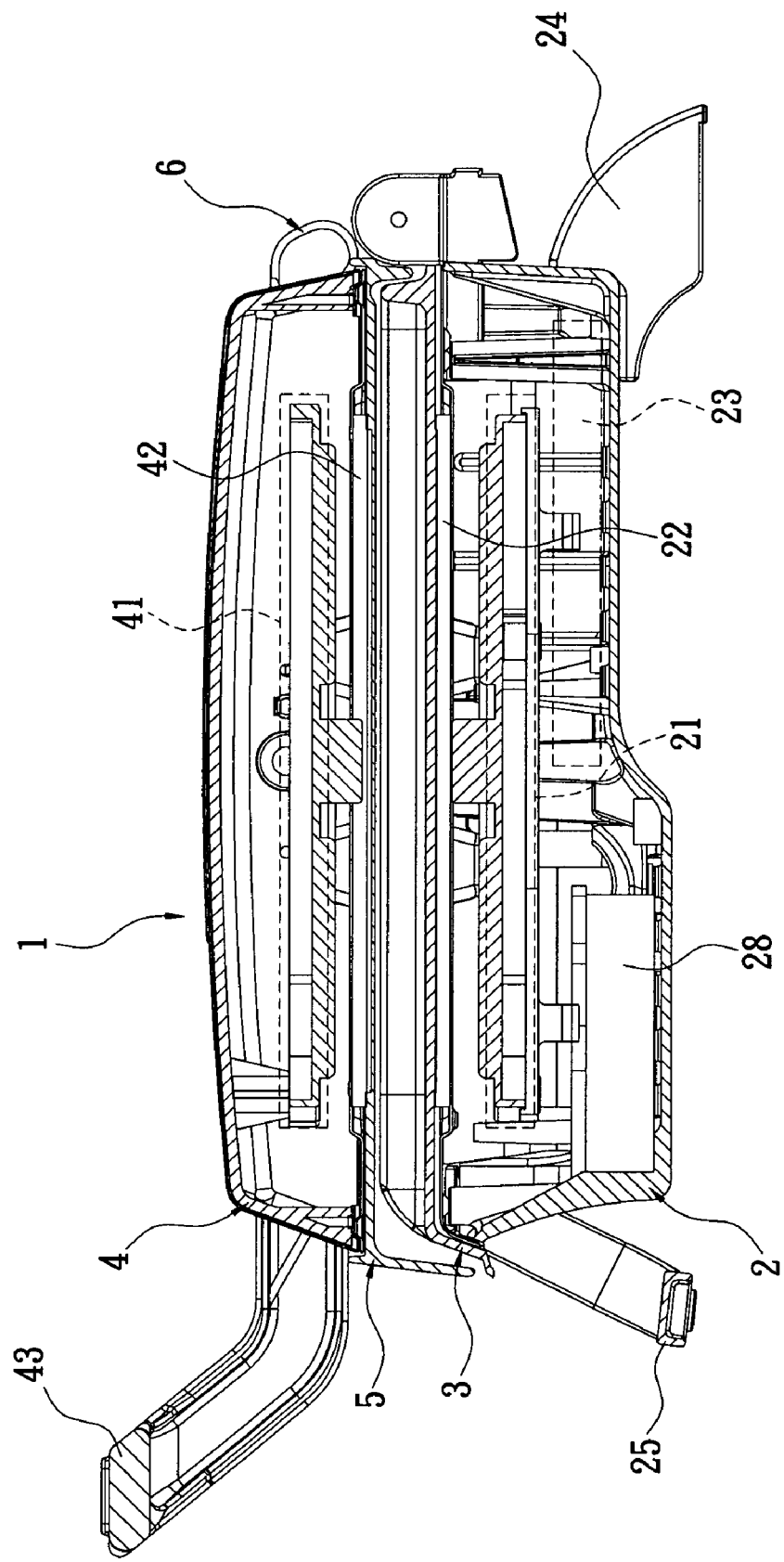
FIG. 2 is a cross-sectional view of an electromagnetic induction heating grill toaster of the present invention.
Figure 3:
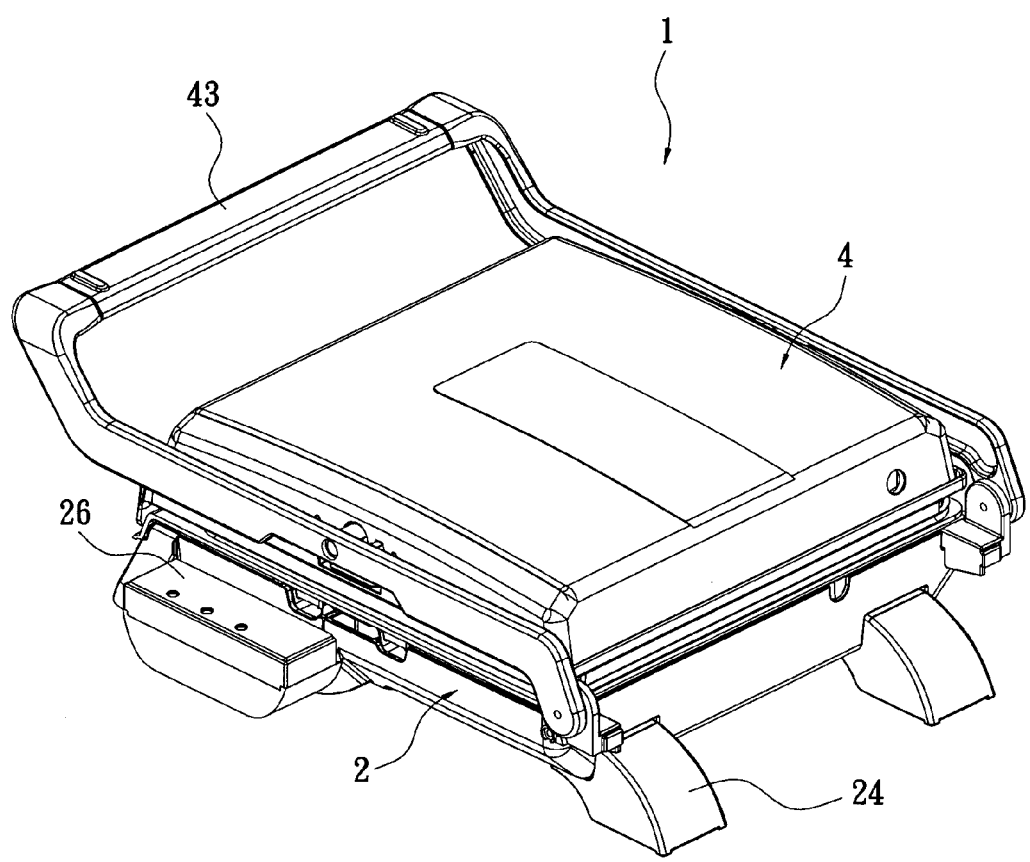
FIG. 3 is a perspective, assembled view of an electromagnetic induction heating grill toaster of the present invention.

Referring to FIGS. 2 to 5, the present invention provides an electromagnetic induction heating grill toaster 1 that includes a first casing body 2, a first baking tray 3, a second casing body 4, and a second baking tray 5. The first casing body 2 has a first electromagnetic induction element 21, a first micro-crystal plate 22, and a control element 23. The control element 23 is disposed on an inner bottom portion of the first casing body 2. The first micro-crystal plate 22 is disposed on a top portion of the first casing body 2. The first electromagnetic induction element 21 is electrically connected with the control element 23. The first electromagnetic induction element 21 is an electromagnetic coil for inducting magnetic materials with iron. Electric currents of the electromagnetic coil generate magnetic flux variations, so that eddy currents are generated in the casing body to directly heat the micro-crystal plate so as to cook food. The control element 23 controls the whole system of the present invention.

The first casing body 2 has two fixed portions 24 and a first handle 25 all disposed on a bottom side thereof. The electromagnetic induction heating grill toaster 1 further includes an operation panel 26 installed on the first casing body 26 for setting cooking (grill and toast) time and temperature, etc. The first casing body 2 has a plurality of first concave grooves 27 respectively formed on two sides thereof for fixing the first baking tray 3 in place. Hence, the first baking tray 3 is detachably disposed on the first casing body 2. The first baking tray 3 is made of magnetic complex materials with iron, such as complex metals or stainless steel, etc. The electromagnetic induction heating grill toaster 1 further includes a heat-dissipating fan 28 disposed in the first casing body 2 for dissipating heat from the control element 23. In addition, the electromagnetic induction heating grill toaster 1 further includes a temperature-controlling element 7 disposed on the first casing body 2.

The second casing body 4 has one side pivoted on one side of the first casing body 2. The second casing body 4 has a second electromagnetic induction element 41 and a second micro-crystal plate 42. The second micro-crystal plate 42 is disposed on a top portion of the second casing body 4. The second electromagnetic induction element 41 is disposed under the second micro-crystal plate 42. The second electromagnetic induction element 41 is an electromagnetic coil for inducting magnetic materials with iron. The second casing body 4 has a second handle 43. The second casing body 4 has a plurality of second concave grooves 44 respectively formed on two sides thereof for fixing the second baking tray 5 in place. Hence, the second baking tray 5 is detachably disposed on the second casing body 4. The second baking tray 5 is made of magnetic complex materials with iron, such as complex metals or stainless steel etc.

The electromagnetic induction heating grill toaster 1 further includes a conductive wire 6. One side of the conductive wire 6 is electrically connected with the first casing body 2. The other side of the conductive wire 6 is electrically connected with the second casing body 4. Hence, the first casing body 2 is electrically connected with the second casing body 4.

The electromagnetic induction heating grill toaster 1 of the present invention utilizes the matching of the two electromagnetic induction elements 21, 41 and the two micro-crystal plates 22, 42 that have the advantage of quick heating, in order to reduce the time required for preheating the electromagnetic induction heating grill toaster 1. Hence, the present invention not only reduces power use, but also reduces the time users must wait for the grill toaster 1 to heat. For example, because the electromagnetic induction of the heating grill toaster 1 is non-contact type heating, the cooking temperature can be increased from 250☐ to 300☐. Hence, when a piece of beef is placed in the heating grill toaster 1, the surface of the beef will appear scorch and crisp, and juice in the beef will be retained in the piece of beef. Hence, the taste of the beef is increased due to cooking the piece of beef at a temperature of 300 ☐.

Figure 4:
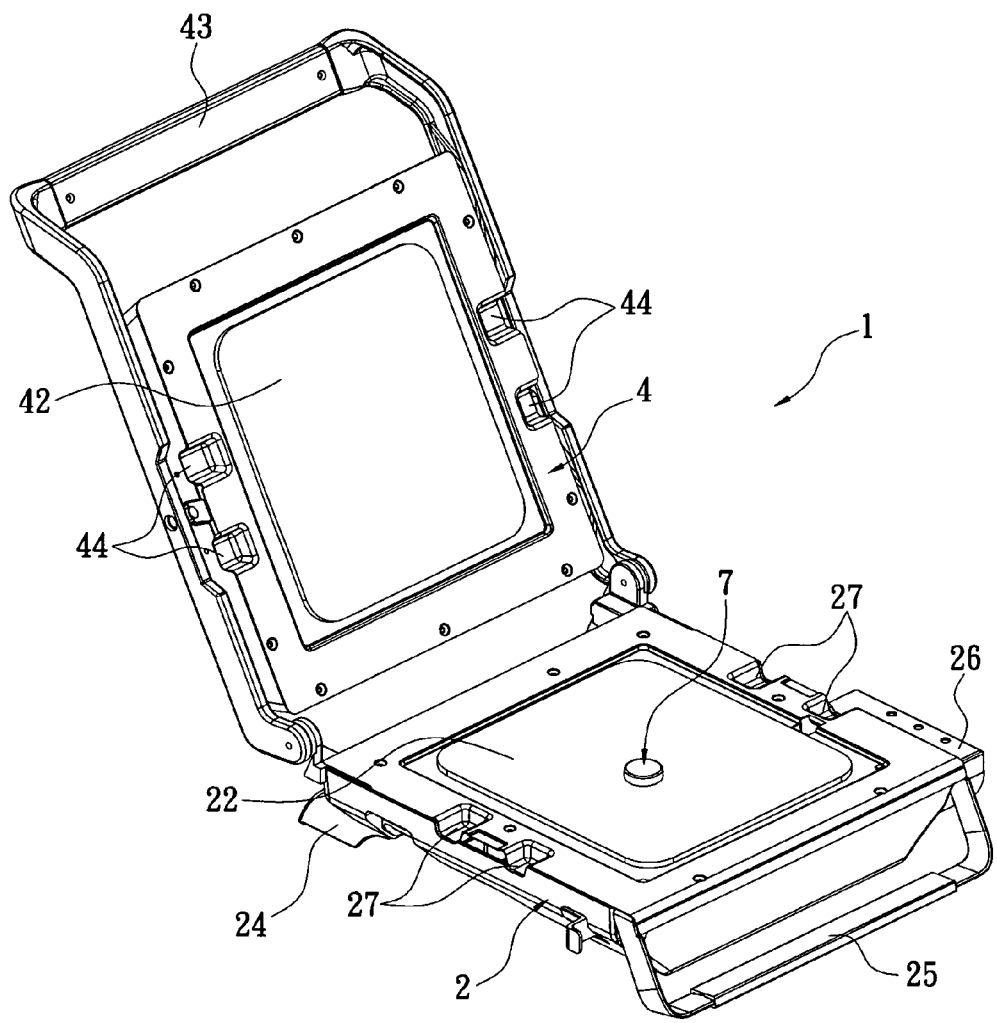
FIG. 4 is a perspective view of an electromagnetic induction heating grill toaster without baking trays of the present invention.
Figure 5:
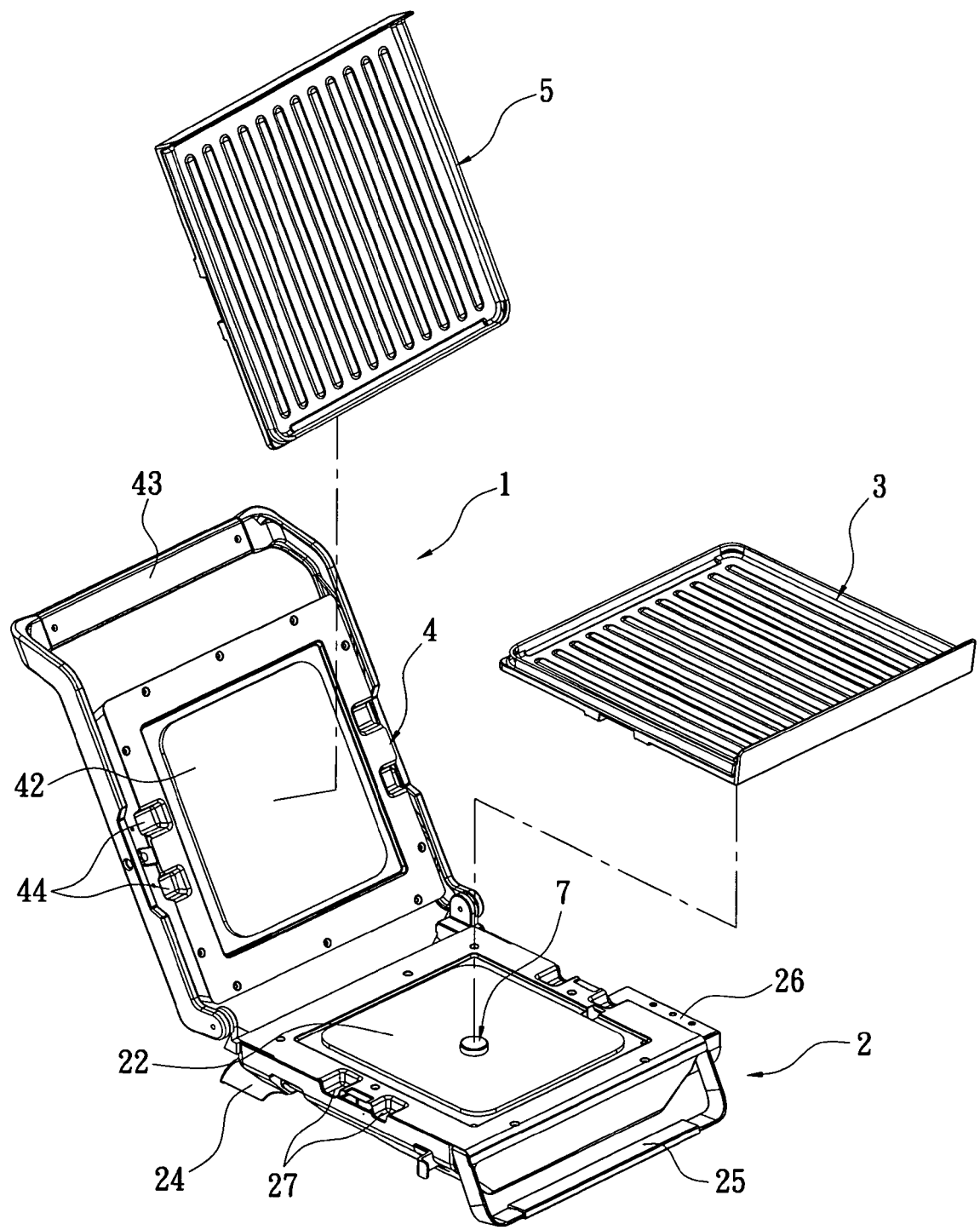
FIG. 5 is a perspective view of an electromagnetic induction heating grill toaster having baking trays of the present invention.
Figure 6:
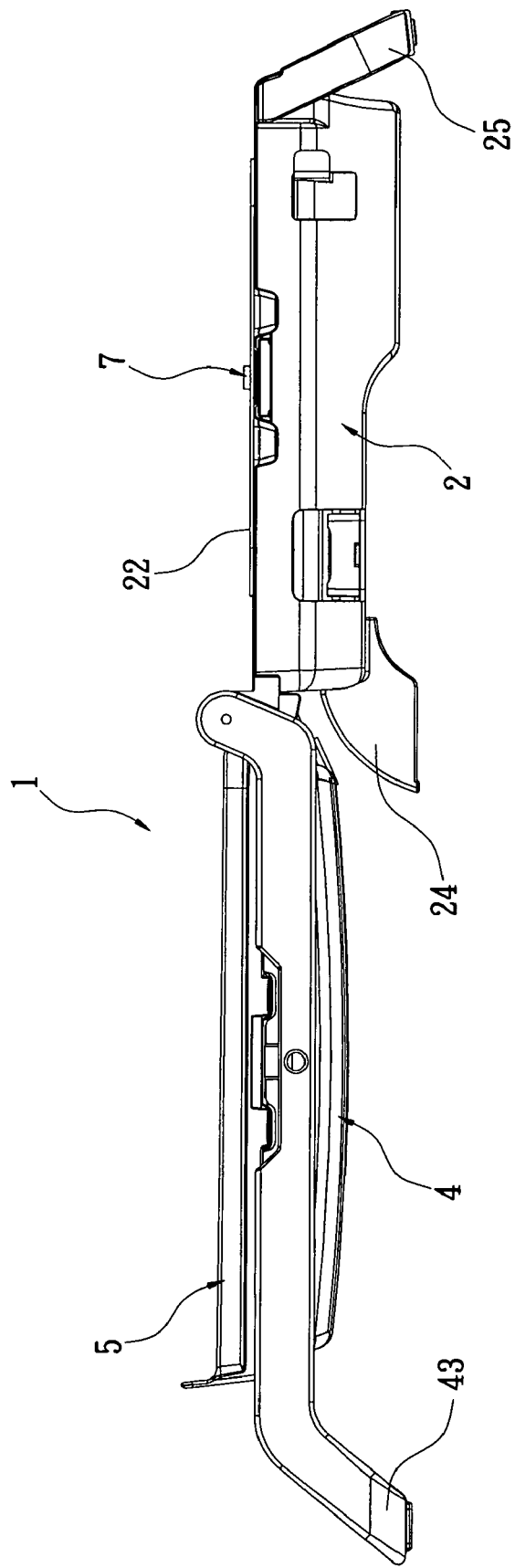
FIG. 6 is a lateral view of an electromagnetic induction heating grill toaster without baking trays of the present invention.
Figure 7:
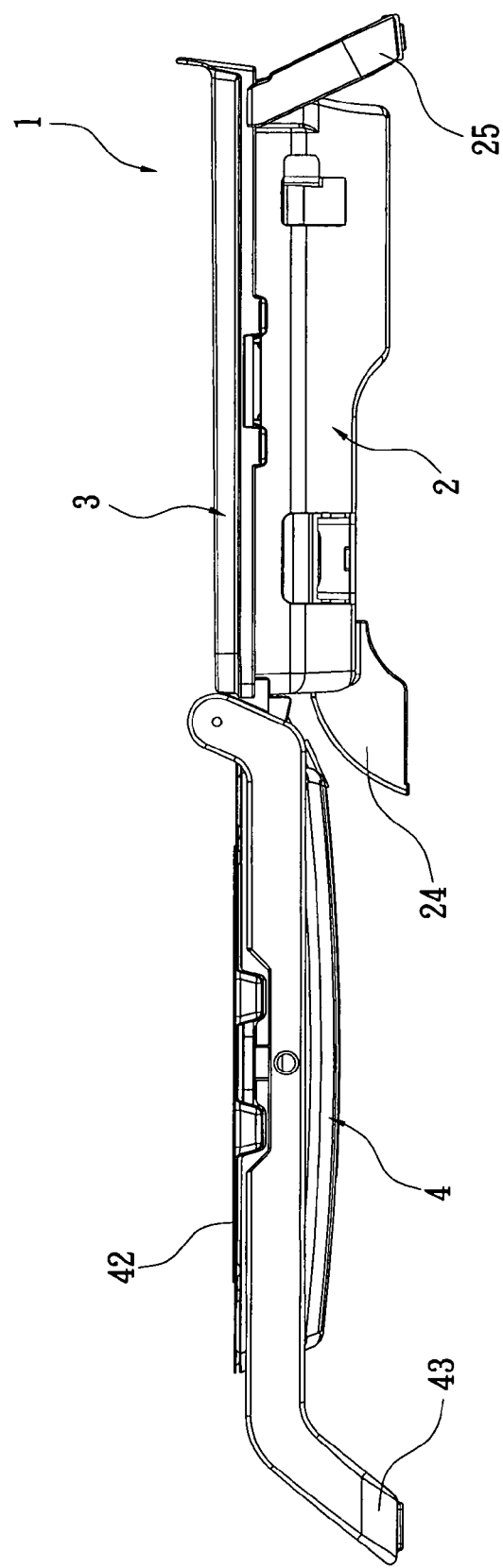
FIG. 7 is a lateral view of an electromagnetic induction heating grill toaster having baking trays of the present invention.

When the first baking tray 3 and the second baking tray 5 are respectively disposed on the first casing body 2 and the second casing body 4 food can be placed on the first baking tray 3 and the second baking tray 5 to grill and toast at the same time (as shown in FIG. 5). When the first baking tray 3 and the second baking tray 5 are respectively detached from the first casing body 2 and the second casing body 4, the heating grill toaster 1 is divided into two separate electromagnetic ovens (as shown in FIG. 4). Moreover, referring to FIGS. 6 and 7, when the first baking tray 3 is detached from the first casing body 2, the first casing body 2 can act as an electromagnetic oven and the second baking tray 5 on the second casing body 4 can be used to grill or toast foods (such as FIG. 6); Alternatively, when the second baking tray 5 is detached from the second casing body 4, the second casing body 4 can act as an electromagnetic oven and the first baking tray 3 on the first casing body 2 can be used to grill or toast foods (such as FIG. 7). Hence, the present invention provides many choices for users. Furthermore, because the first baking tray 3 and the second baking tray 5 are respectively detachably disposed on the first casing body 2 and the second casing body 4, it is easy for user to assemble, detach, and clean the first baking tray 3 and the second baking tray 5. The second casing body 4 is selectively rotated relative to the first casing body 2 from 0~180 degrees according to the user's needs.

In conclusion, the electromagnetic induction heating grill toaster 1 has the following advantages:

1. The present invention has two functions that are cooking (grilling or toasting) foods and acting as an electromagnetic oven.

2. The present invention utilizes the advantage of quick heating of electromagnetic induction, in order to reduce the time required for the grill toaster 1 to preheat. Hence, the present invention not only reduces power use, but also reduces the amount of time users have to wait before they can begin cooking.

3. Because the two baking trays 3, 5 are respectively detachably disposed on the two casing bodies 2, 4, it is easy for user to assemble, detach, and clean the two baking trays 3, 5.

4. Because the first baking tray 3 and the second baking tray 5 are magnetic complex materials with iron, the two baking trays 3, 5 can be heated by electromagnetic induction and have good heat-conducting properties.

Although the present invention has been described with reference to the preferred best molds thereof, it will be understood that the invention is not limited to the details thereof Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An electromagnetic induction heating grill toaster, comprising:
    a first casing body having a first electromagnetic induction element, a first micro-crystal plate, and a control element, wherein the control element is disposed on an inner bottom portion of the first casing body, the first micro-crystal plate is disposed on a top portion of the first casing body, and the first electromagnetic induction element is electrically connected with the control element;
    a heat-dissipating fan disposed in the first casing body;
    a first baking tray detachably disposed on the first casing body;
    a second casing body having one side pivoted on one side of the first casing body, and having a second electromagnetic induction element and a second micro-crystal plate, wherein the second micro-crystal plate is disposed on a top portion of the second casing body, and the second electromagnetic induction element is disposed under the second micro-crystal plate; and
    a second baking tray detachably disposed on the second casing body.

2. The electromagnetic induction heating grill toaster as claimed in claim 1, further comprising a conductive wire electrically connected between the first casing body and the second casing body.

3. The electromagnetic induction heating grill toaster as claimed in claim 1, wherein the first casing body has two fixed portions and a first handle disposed on a bottom side thereof.

4. The electromagnetic induction heating grill toaster as claimed in claim 1, further comprising an operation panel installed on the first casing body.

5. The electromagnetic induction heating grill toaster as claimed in claim 1, wherein the first casing body has a plurality of first concave grooves respectively formed on two sides thereof for fixing the first baking tray.

6. The electromagnetic induction heating grill toaster as claimed in claim 1, wherein both the first electromagnetic induction element and the second electromagnetic induction element are electromagnetic coils.

7. The electromagnetic induction heating grill toaster as claimed in claim 1, wherein both the first baking tray and the second baking tray are magnetic complex materials with iron.

8. The electromagnetic induction heating grill toaster as claimed in claim 1, wherein the second casing body has a second handle.

9. The electromagnetic induction heating grill toaster as claimed in claim 1, wherein the second casing body has a plurality of second concave grooves respectively formed on two sides thereof for fixing the second baking tray.

10. The electromagnetic induction heating grill toaster as claimed in claim 1, wherein the second casing body is rotated relative to the first casing body from 0~180 degrees.

11. The electromagnetic induction heating grill toaster as claimed in claim 1, further comprising a temperature-controlling element disposed on the first casing body.

* * * * *